United States Patent [19]
Pearce et al.

[11] 3,779,936
[45] Dec. 18, 1973

[54] CALCIUM CHLORIDE AND POLYETHYLENE GLYCOL DESICCANT BRIQUETTE

[75] Inventors: Roscoe L. Pearce, Midland; Gerald C. Stalker, Bay City; John L. Arnold, Midland, all of Mich.

[73] Assignee: The Dow Chemical Company, Midland, Mich.

[22] Filed: Feb. 4, 1972

[21] Appl. No.: 223,519

Related U.S. Application Data

[63] Continuation-in-part of Ser. No. 142,994, May 13, 1971, abandoned.

[52] U.S. Cl................. 252/194, 55/35, 210/502, 423/178
[51] Int. Cl............................. B01d 53/26
[58] Field of Search............. 252/194, 429, 441, 252/475; 55/35; 423/178; 210/62, 510, 502

[56] References Cited
UNITED STATES PATENTS

| | | | |
|---|---|---|---|
| 2,967,153 | 1/1961 | Houston | 252/194 |
| 2,967,154 | 1/1961 | Beerman | 252/194 |
| 3,264,202 | 8/1966 | King | 252/194 |
| 3,272,742 | 9/1966 | Polishuk | 252/194 |
| 3,334,468 | 8/1967 | Wilcox | 252/194 |

*Primary Examiner*—Leon D. Rosdol
*Assistant Examiner*—Irwin Gluck
*Attorney*—William M. Yates

[57] ABSTRACT

Disclosed is an improved method for the briquetting of calcium chloride. The method involves intermixing polyethylene glycol with the calcium chloride fines to be briquetted. The use of polyethylene glycol, which ranges in molecular weight from 1000 to 200,000 and is employed in an amount of from 0.1 to 10 weight percent of the calcium chloride, provides briquettes having distinct advantages over calcium chloride briquettes prepared without such an additive.

5 Claims, 1 Drawing Figure

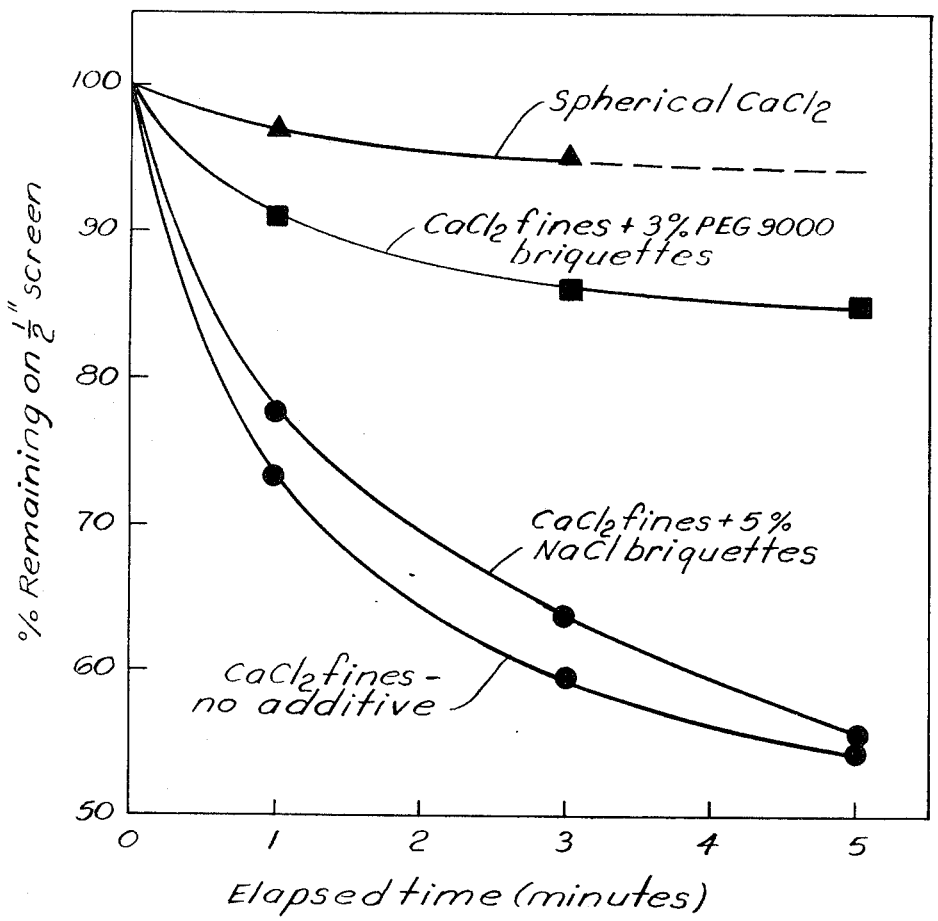

CALCIUM CHLORIDE AND POLYETHYLENE GLYCOL DESICCANT BRIQUETTE

BACKGROUND OF THE INVENTION

This application is a continuation-in-part of our copending application Ser. No. 142,994 filed May 13, 1971 and now abandoned.

Commercial grade calcium chloride is a widely used desiccant due to its low cost and high degree of hydroscopicity. In one application, calcium chloride, in the form of solid lumps or discrete particles, is charged to a gas drying column. As gases containing water vapor are passed through the bed of calcium chloride particles, water is picked up forming an aqueous calcium chloride solution which accumulates on the particle surfaces. Continued accumulation results in the solution flowing to the lower parts of the column. There exists a problem of the $CaCl_2$ crystallizing from the aqueous solution before it drains from the bed section. This crystallization can occur for example when a sudden drop in ambient temperature is experienced and is responsible for the phenomenon known as bridging. Bridging is the formation of a solid connecting link between the calcium chloride particles caused by the aforementioned crystallization. As the particles of calcium chloride continue to dissolve, these links form an interconnecting structure which may have enough strength to support the remainder of the bed. Continued bridging results in the formation of a solid $CaCl_2$ bed through which the gas has difficulty in passing. Normally, when bridging has occurred to a degree sufficient to restrict the flow of gas through the bed, tunnel-like pathways called channels are formed due to preferential flow of the gas. The net result of channeling is a reduction in the effective surface area of calcium chloride exposed to the gas stream. This reduction in surface area reduces the efficiency of the drying unit. Moreover, bridging tends to prevent the body of calcium chloride pellets from moving downwardly in the drying unit as the drying operation proceeds. Downward movement is desirable since it helps to free the desiccant particles from each other and restore drying efficiency.

The problem of bridging can be substantially reduced by preparing a spherical $CaCl_2$ particle. The reduced particle to particle contact sites provided by a bed of spheres permits drainage of the brine with less crystallization than is the case with pillow shaped briquettes. Spherical granules cannot be efficiently made by briquetting since $CaCl_2$ is one of the most difficult solids to briquette. Accordingly, spherical pellets are made by concentrating $CaCl_2$ brine, drying the resulting material on shelf dryers and segregating particles on appropriate screens; a process which is more costly than briquetting.

Bridging of pillow shaped particles made by briquetting can be reduced by mixing crystals such as NaCl or $Na_2CO_3$ with $CaCl_2$ fines and briquetting the mixture of salts. This method, which is disclosed in U. S. Pat. No. 3,334,468, effectively reduces the problem of bridging when from about 2 to 5 weight percent of NaCl or $Na_2CO_3$ is briquetted with the $CaCl_2$. However, the briquettes made from mixtures of $CaCl_2$ and NaCl tend to break up more readily than is desirable for gas field use.

Irregardless of the problem of bridging, it is advantageous to prevent the crystallization of $CaCl_2$ brine in a gas drying column. Such crystallization is undesirable because a saturated $CaCl_2$ solution (43 percent) possesses a significant desiccant capacity. This phenomena is taken advantage of in some drying columns by the use of recirculating trays. In this type of column, trays are placed at the bottom of the drying column to catch the brine and keep it in close proximity to the gas stream.

It is an object of the present invention to provide a composition, comprising $CaCl_2$ as the major component, which can readily be briquetted into granules suitable for desiccant use.

An additional object is to provide such a composition which is less susceptible to breakage during and after briquetting than is pure $CaCl_2$.

An additional object is to provide such a composition whose saturated solutions recrystallize at lower temperatures than do $CaCl_2$ solutions containing no additive.

A further object is to provide such a composition which when formed into pillow shaped briquettes and placed in a gas drying column more effectively dries the stream than those compositions previously used.

SUMMARY OF THE INVENTION

The disclosed invention is a composition of matter which comprises $CaCl_2$ as a major component in admixture with a polyethylene glycol (PEG) as a minor component. The polyethylene glycol, which has a molecular weight of from about 1,000 to 200,000 accounts for from 0.1 to 10 weight percent of the composition. Also disclosed is an improved method of briquetting $CaCl_2$ which involves adding polyethylene glycol to the $CaCl_2$ before compaction. The $CaCl_2$ composition of the present invention forms a saturated solution which crystallizes at an unexpectedly low temperature and is therefore preferable to unaltered $CaCl_2$ for use as a desiccant.

DETAILED DESCRIPTION

In preparing the composition for briquetting the $CaCl_2$ fines are thoroughly mixed with the PEG particles. The shape or size of these particles is not critical; however, the PEG must be in the solid state. Particles of about the size and shape of soap flakes have been used effectively. Polyethylene glycols having molecular weights within the range of from 1,000 to 200,000 may be advantageously employed. A molecular weight range of from 2,000 to 60,000 is especially effective with the preferred molecular weight ranging from 4,000 to 9,000. The amount of PEG employed ranges from 0.1 up to about 10 weight percent of the $CaCl_2$ in the formulation. Preferred concentrations range from 1 to 3 weight percent.

The following examples will serve to further illustrate the invention. The briquettes used in these examples were prepared in a Komarck-Graves briquetter having a pocket size such that the briquette was 5/8 inches in the shortest dimension and 1 1/16 inches in the longest.

EXAMPLE I

Three separate sets of briquettes were prepared from $CaCl_2$ fines. Set No. 1 was prepared by compacting the fines without any additive, set No. 2 contained 3 percent polyethylene glycol 9,000 and set No. 3 contained 5 percent NaCl. Spherical agglomerates, 1/2 inch in diameter and prepared as described on page three, supra, were tested for tumbling attrition along with the briquettes of sets 1, 2, and 3.

The attrition test involved placing the material to be tested on a 1/2 inch screen which was agitated with a Ro-Tap vibrator. The drawing graphically represents the results of such testing. From the drawing it can be seen that those CaCl₂ briquettes containing 3 percent PEG 9,000 were substantially more resistant to breakage than unaltered CaCl₂ briquettes or CaCl₂ briquettes containing NaCl and only slightly less resistant than the spherical particles.

Resistance to breakage is directly related to the efficacy of using briquettes in a gas drying column. Attrition during shipment results in the presence of fines in the shipping container. Since as a practical matter it is impossible to separate fines from unbroken briquettes in the gas fields, both forms of CaCl₂ find their way into the drying column. The presence of fines encourages the formation of a super saturated solution having a high freezing point. A high freezing point is directly related to bridging. Thus, increasing the resistance to breakage has a significant effect on bridging in the column due to reduction in the amount of CaCl₂ fines created during shipment.

EXAMPLE II

In order to determine the effect of the polyglycol additive on pelleting efficiency, replicate sets of up to 100 pellets were prepared on a hand operated pelletizer having a cavity of sufficient size to prepare a 0.18 inch by 0.41 inch pellet. Polyethylene glycols of varying molecular weights were employed as additives at various loadings. Calcium chloride pellets containing no PEG were prepared as a control. Table I sets out the various formulations tested as well as the percent of broken pellets observed for each formulation.

TABLE I

| Formulation Tested | & Broken Pellets |
| --- | --- |
| CaCl₂ (control) | 21.5 |
| CaCl₂+1% PEG 20,000 | 1.1 |
| CaCl₂+2% PEG 20,000 | 2.2 |
| CaCl₂+3% PEG 20,000 | 3.3 |
| CaCl₂+4% PEG 20,000 | 1.1 |
| CaCl₂+5% PEG 20,000 | 1.1 |
| CaCl₂+3% PEG 1450 | 1.7 |
| CaCl₂+3% PEG 6000 | 1.7 |
| CaCl₂+3% PEG 9000 | 1.7 |

We claim:

1. A composition of matter which comprises CaCl₂ as a major component in admixture with polyethylene glycol as a minor component, the polyethylene glycol being further defined in that it has a molecular weight within the range of from 1,000 to 200,000 and makes up from 0.1 to 10 weight percent of the composition.

2. The composition of claim 1 wherein the molecular weight of the polyethylene glycol is within the range of from 2,000 to 60,000.

3. The composition of claim 1 wherein the molecular weight of the polyethylene glycol is within the range of from 4,000 to 9,000.

4. The composition of claim 1 wherein the polyethylene glycol is employed in an amount of from 1 to 3 weight percent of the composition.

5. The composition of claim 2 wherein the polyethylene glycol is employed in an amount of from 1 to 3 weight percent of the composition.

* * * * *